United States Patent [19]

Rogers et al.

[11] Patent Number: 4,483,454
[45] Date of Patent: Nov. 20, 1984

[54] BAFFLE FOR LIQUID CARGO CARRIER

[75] Inventors: Thelmer A. Rogers; Thomas A. Rogers, both of Lubbock, Tex.

[73] Assignee: Lubbock Manufacturing Company, Lubbock, Tex.

[21] Appl. No.: 864,784

[22] Filed: Dec. 27, 1977

Related U.S. Application Data

[63] Continuation-in-part of Ser. No. 778,983, Mar. 18, 1977, abandoned.

[51] Int. Cl.³ ............................................... B65D 7/02
[52] U.S. Cl. .................................. 220/5 A; 220/1 V; 220/22; 220/85 S
[58] Field of Search ............... 220/22, 1 V, 901, 20.5, 220/85 S, 5 A

[56] References Cited

U.S. PATENT DOCUMENTS

| | | | |
|---|---|---|---|
| 2,417,337 | 3/1947 | Whitesell, Jr. | 220/22 |
| 2,503,792 | 4/1950 | Brandon | 220/5 A |
| 2,609,118 | 9/1952 | Cattaneo | 220/22 X |
| 3,043,465 | 7/1962 | Horner | 220/5 A |

Primary Examiner—Steven M. Pollard
Attorney, Agent, or Firm—Wendell Coffee

[57] ABSTRACT

In a tank for transporting compressed liquified gasses, a rigid baffle is placed at the top of the liquid. This baffle prevents any portion or segment of the liquid from rising above a static level and therefore prevents lateral surging as well as forward and aft surging. One embodiment is a plate-like horizontal baffle and another is a baffle forward of a plurality of vapor traps depending from the top. A clear, open passageway under the baffles provides workmen rapid access to the manhole.

2 Claims, 10 Drawing Figures

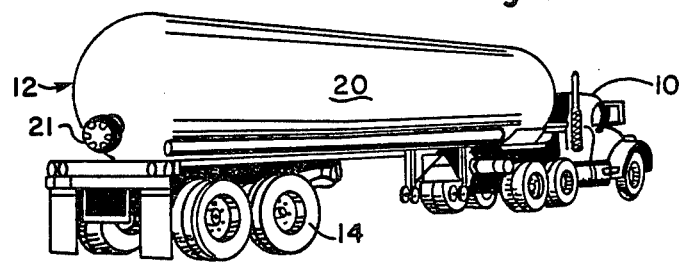
Fig. 1
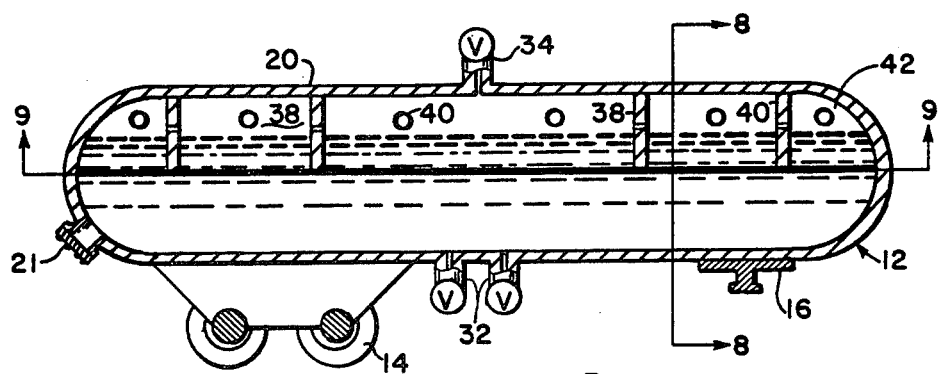
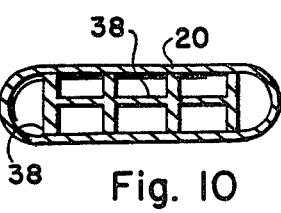
Fig. 10
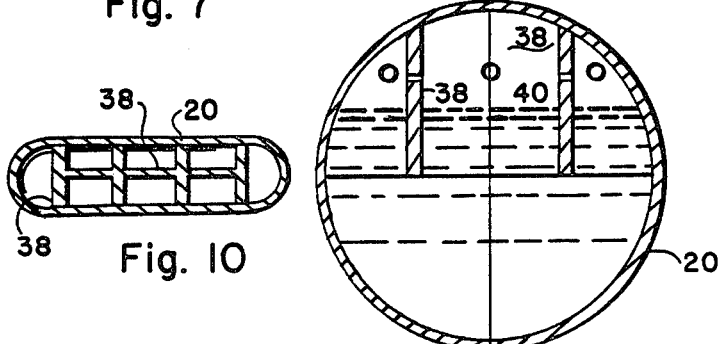
Fig. 7
Fig. 8
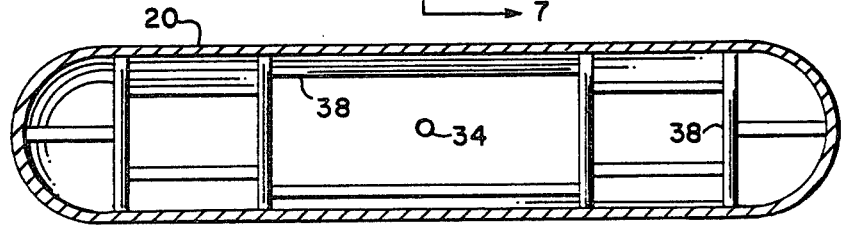
Fig. 9

BAFFLE FOR LIQUID CARGO CARRIER

CROSS-REFERENCE TO RELATED APPLICATIONS

This is a continuation-in-part of our prior application Ser. No. 778,983, filed Mar. 18, 1977, now abandoned.

BACKGROUND OF THE INVENTION (1) Field of the Invention.

This invention relates to tanks for transporting compressed liquified gasses and more particularly to baffles to prevent surging.

(2) Description of the Prior Art.

Compressed liquified gasses are common commodities of commerce. Liquified petroleum gasses and ammonia are two examples. Safety as well as regulations require that a tank containing such a product have the top left for vapor space above the liquid. Also, when making deliveries, the tank is partially filled.

Having the tank only partially filled causes a surging problem of the liquid. Customarily these tanks are long and cylindrical having a length many times their diameter. Therefore, the principal surging problem is to prevent the liquid from surging forward and aft. Many baffles have been designed for this purpose. Normally these baffles are attached to the bottom of the tank, forming obstacles for workmen in the tank at times of construction, maintenance and repair. Normally these baffles are transverse the tank which prevents the liquid from surging forward and back, but do nothing to prevent the liquid from shifting laterally.

Transporting these liquids, particularly on the highway, present a problem of lateral shifting. As the transport truck moves along the highway, it is necessary to move from one lane to another and around curves. These maneuvers cause the liquid to shift or slosh. Workers in the field have attempted to solve this long standing problem. E. G. Kramer, U.S. Pat. No. 1,462,347, suggested using longitudinal baffles or surge plates within the tank to prevent this lateral surging.

SUMMARY OF THE INVENTION (1) New and Different Function.

We have discovered that if a horizontal baffle is placed at about the top of the liquid level, that this will prevent not only fore and aft surging, but also lateral surging. I.e., if the liquid moves either to one side or the other or forward or aft, the result is that the level or the top face of the liquid must rise one place or the other. If any portion or segment of the top face of the liquid can be prevented from rising, the entire mass will not shift or slosh and there will not be a surge of weight either fore or aft or side to side. The effect might be likened to carrying a full tank of liquid. Obviously, if the tank is entirely filled with liquid, there will be no surging or shifting of weight for and aft or laterally.

Therefore, we have provided a baffle which more effectively controls the surging of the liquid fore and aft and also side to side at no greater expense. The liquid can be prevented from rising by a plurality of vapor traps which hang from the top of the tank. In either construction, an open, clear passageway for the workmen is provided along the bottom of the tank.

The function of the combination is greater than the sum of the results of each individual component.

(2) Objects of this Invention.

An object of this invention is to transport compressed liquified gasses.

Another object is to prevent surging in such transport.

Further objects are to achieve the above with a device that is sturdy, compact, durable, lightweight, simple, safe, efficient, versatile, ecologically compatible, energy conserving, and reliable, yet inexpensive and easy to manufacture, install, and maintain.

Other objects are to achieve the above with a method that is versatile, ecologically compatible, energy conserving, efficient, and inexpensive, and does not require highly skilled people to install, and maintain.

The specific nature of the invention, as well as other objects, uses, and advantages thereof, will clearly appear from the following description and from the accompanying drawing, the different views of which are not to scale.

BRIEF DESCRIPTION OF THE DRAWING

FIG. 1 is a perspective view of a tank transport according to this invention.

FIG. 7 is a longitudinal section of the tank showing a fifth embodiment taken substantially on line 7—7 of FIG. 8.

FIG. 8 is a cross sectional view of the fifth embodiment taken substantially on line 8—8 of FIG. 7.

FIG. 9 is a sectional view taken substantially on line 9—9 of FIG. 7.

FIG. 10 is a schematic representation of a tank showing a different arrangement of baffles of the fifth embodiment.

BRIEF DESCRIPTION OF THE PREFERRED EMBODIMENTS

Figure 2:
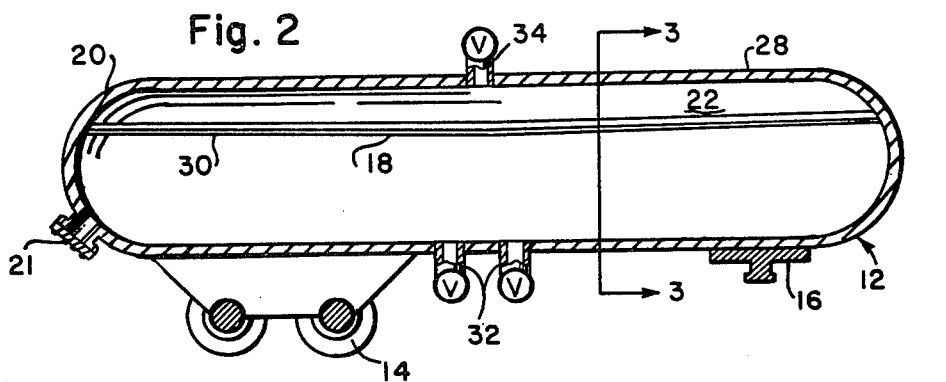
FIG. 2 is a longitudinal section of the tank showing a first embodiment of my invention taken substantially on line 2—2 of FIG. 3.

Referring to FIG. 1, there may be seen a semi-transport rig including tractor 10 attached to the tank trailer 12. It will be understood that the tank trailer includes trailer wheels 14 and hitch or fifth wheel 16. As explained above, under the usual road conditions, traffic, starts and stops, the contents of the tank trailer surges backward and forward unless restrained. Also, on shifting lanes or turning corners the contents tend to laterally shift unless restrained. The lateral shifting would tend to overturn the rig.

It will be understood that tank 20 is filled with a compressed liquified gas product. The majority of the shell of the tank will be filled with the liquid phase of the product and the remainder of the tank will be filled with the gas phase of the product. The two phases will be in fluid communication with each other and there be a liquid-gas interface between the two phases.

Figure 3:
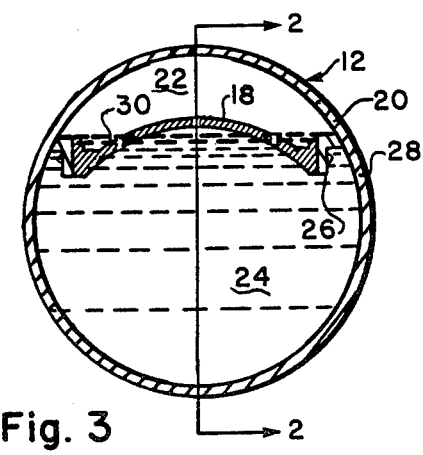
FIG. 3 is a cross sectional view taken substantially on line 3—3 of FIG. 2.

According to my invention, the first embodiment as seen in FIGS. 2 and 3, rigid baffle 18 is attached within the tank at about the liquid level.

It may be seen that tank 20 is a right circular cylinder with hemispherical heads. Manhole 21 provides access to the inside of the tank for workers. It will be understood that the tank could be any of several configurations, however, because ease of construction, normally, the tank will be cylindrical and of circular cross section. Sometimes the diameter of the tank will vary so that it is not completely cylindrical, but normally the cross section of the tank will be circular. It is not necessary that the cross section be circular, but in all instances to withstand the pressure of the cargo, which is compressed liquified gas, it will be arcuate.

The baffle 18 is a horizontal plate and placed inside of the tank proximate and slightly below the liquid-gas interface. As seen in FIGS. 2 and 3, the cylindrical baffle 18 is convex on the vapor side or vapor chamber 22 and concave on the liquid chamber or area 24. We calculate that as long as at least 90% of the liquid is below the baffle 18, the baffle will effectively prevent both undue fore and aft and lateral surging.

The baffle 18 is conveniently held rigidly in place by clips or internal flange 26 attached to the inside of the shell 28 of the tank 20. There are numerous small vapor vents 30 for vapor to freely pass from the liquid area 24 to the vapor area 22 and, also, when there is movement from one side to the other, of course, a slight amount of fluid will go through the vents 30 and which will run back into the liquid area. The baffle is effective to retard the flow of the liquid phase, but permits a vapor flow.

Fill and outlet tubes 32 with valves and pressure relief valve 34 are provided as is conventional. It will be understood that the tank will have all the standard equipment; however, inasmuch as this invention is not concerned with such, they have not been shown for purposes of simplicity.

Figure 4:
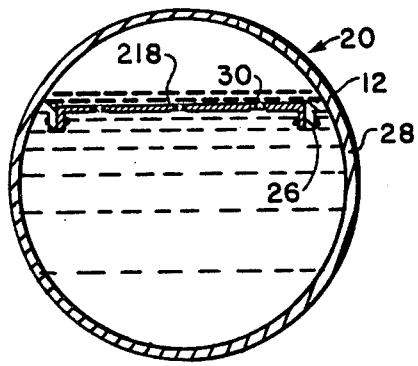
FIG. 4 is a cross sectional view similar to FIG. 3 showing a second embodiment.

FIG. 4 shows a configuration of a second embodiment of rigid baffle 218. The baffle 218 is a horizontal plate and also located within the tank 20 and is rigidly attached by any suitable means such as bolts, rivets or welding to the clips or internal flange 26. The main distinction is that the second embodiment of the baffle is shown as a rigid, flat horizontal plate, also having the small vapor vents 30 therethrough.

Figure 5:
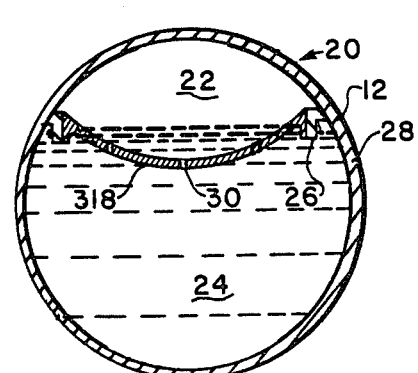
FIG. 5 is a cross sectional view similar to FIG. 3 showing a third embodiment.

A third embodiment of rigid horizontal baffle plate 318 is shown in FIG. 5 which is likewise located within the tank 20 and rigidly held in place by the clips 26 and has the small vapor vents 30 therethrough. It is cylindrical and has, however, in this case, a concave surface upward, facing the vapor area and a convex surface downward facing the liquid area 24.

Figure 6:
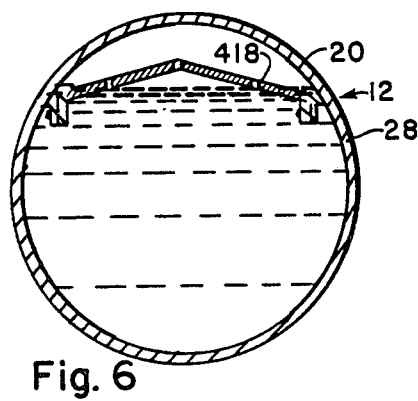
FIG. 6 is a cross sectional view similar to FIG. 3 showing a fourth embodiment.

FIG. 6 shows a fourth embodiment of rigid horizontal plate baffle 418. The baffle 418 is of inverted "V" or roof top shape within the tank 20.

As may be seen, this invention prevents the liquid in any portion or segment from rising above its static level. Of course, by any portion or segment we mean the forward portion or segment of the tank and, therefore, prevents the liquid in the forward portion or segment from rising above its static level. Also on the right side or the left side, it prevents the liquid in this portion or segment from rising above the static level.

In certain cases it may be necessary or desirable to have two baffles. I.e., often a tank is a dual purpose tank, hauling both hydrocarbons such as propane and, also, ammonia. Inasmuch as ammonia has a greater specific gravity, the volume of ammonia is less. Therefore, it may be desirable to have a rigid baffle at approximately the 70% level, which would be the portion of the tank carrying ammonia and at about the 80% level which would be the tank carrying hydrocarbons.

It may be seen that in every instance there is an open or clear passageway along the bottom of the tank from manhole 21 in the rear bottom half of the tank for the entire length of the tank. It will be understood that it is necessary for workmen to work inside the tank in construction, maintenance and repair. In the event of some accident, e.g., a fire, it is highly desirable to have a clear passageway to the manhole. It will be especially understood that this is important because the workmen are encumbered by equipment or supplies, such as welding rods held on belts.

When the term "small vapor vent" is used, it is meant: a hole or aperture which will permit considerable flow of vapor, but prevents any substantial or considerable flow of liquid. Although we do not mean to be restricted to specific sizes, these vents would be in the nature of one centimeter in diameter. A plurality of vents of this diameter will be sufficient to permit the liquid above the baffle to drain into the space below the baffle when the tank was being unloaded or permit a small portion of the liquid phase of the product to be loaded above the baffle at the time of loading. However, the liquid flow would be very small through the vapor vents. The small vents would retard any major flow of liquid as would be necessary to prevent surging. Likewise in the event of some emergency, they would permit a considerable flow of vapor through the vapor vents in the event of the necessity of relieving the pressure below the baffle as well as above it in the event the pressure valve 34 were to open. Those with skill in the tank design will understand that sufficient vapor vents could be provided which would permit the full vapor capacity of the valve 34 to be available from beneath the baffle, still, because of the viscosity of the liquid, it would prevent any substantial liquid flow through the small vapor vents. Also, manholes and hand holes with bolted covers could be provided through the baffles.

The fifth embodiment, as seen in FIGS. 7, 8, 9, and 10, has a series of vapor traps depending from the top of the tank. The vapor traps are formed by a plurality of rigid curtains or hanging rigid partitions or rigid valances 38. These rigid valances extend from the top of the tank down to a level below the liquid gas interface. Each vapor trap formed by this series of valances has small vent 40 into the vapor traps adjacent to it. Looking at FIG. 7 for example, there will be seen that if there were any fore and aft surging, the liquid would have to move forward, which is to say that the liquid would have to move into forward most vapor trap 42. However, since the vapor is contained in this trap 42, it will be understood that the vapor trap prevents the liquid in this area or portion from moving upward. If the liquid in this area or portion cannot move upward, it cannot surge forward. Likewise, referring to FIGS. 8 and 9, it may be seen that if the liquid tended to surge laterally, it would be caught in one of the side vapor traps on one side or the other and the vapor can leave the vapor trap only by the small vent 40.

As with the other embodiments, the tank 20 has fill tubes 32 and pressure relief valve 34.

Analyzing the fifth embodiment, it will be understood that the vapor traps do not stop the upward movement of the liquid like the first four embodiments would, but they have more of a shock absorber action. This is quite effective in prohibiting the surging of the liquid.

In the event the relief valve 34 were to open, it will be seen that it would relieve the pressure mainly in the middle compartment immediately below the pressure valve 34. But, it will be seen that as the pressure is reduced here, the pressure remains on the other vapor traps and, therefore, as the reduction of the pressure on pressure valve 34, it would permit a rise of liquid in the vapor trap below the valve. However, as soon as the liquid rises, the excess gas pressure or greater gas pressure in the other vapor traps would immediately cause a vapor flow through the vapor holes 40 into the next adjacent vapor trap. Therefore, before there was a substantial rise in this compartment, the vapor from the adjacent vapor traps would flow into it to prevent the rise.

FIG. 10 shows a different arrangement of the valances. In FIG. 10, a single longitudinal baffle or valance 38 extends longitudinally of the tank.

It will be understood that in addition to trapping the vapor within the vapor traps described above, the valances extend, as shown, about halfway of the height of the tank. I.e., that of the total height from the top to bottom of the tank the valances extend down about halfway. This provides an ample, clear open passageway, giving good access by the workers to the manhole 21 in the bottom half of the tank. In addition, these valances also prevent the surging of the liquid. It will be understood that even without the trapped vapor above the gas liquid interface, the baffles extending into the liquid will cause a turbulence or a restriction of the flow of the liquid. This baffle which causes turbulence below it aids in the effective prevention of surging. It will be understood that the liquid surge is more extreme if there is a completely clear and uninterupted smooth flow along a smooth tank.

The embodiments shown and described above are only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

- 10 tractor
- 12 trailer, tank
- 14 wheel, trailer
- 16 hitch
- 18 baffle
- 20 tank
- 21 manhole
- 22 vapor
- 24 liquid area
- 26 clips
- 28 shell
- 30 vapor vents
- 32 fill tube
- 34 valve, pressure
- 36 transverse baffles
- 38 valance
- 40 vapor vent
- 140 slot vapor vent
- 42 forward trap
- 218 baffle
- 318 baffle
- 418 baffle

We claim as our invention:

1. In a tank for transporting a compressed liquified gas product,
   a. said tank having an arcuate shell,
   b. a manhole entering into the bottom half of said tank through said shell,
   c. a compressed liquified gas product in said shell with
      (i) the liquid phase of the product filling a majority of the tank,
      (ii) the gas phase thereof filling the remainder of the tank, and
      (iii) the two phases in fluid communication with each other and having an interface therebetween; the improved baffle structure to prevent surging of the liquid comprising:
   d. a rigid baffle in the form of a horizontal plate rigidly fixed to the shell,
   e. at least part of the baffle below the liquid-vapor interface,
   f. small vapor vents in said baffle,
   g. at least 90% of the liquid phase below the baffle,
   h. at least 95% of the vapor phase above the baffle, and
   h. an open passageway to the manhole below the baffle,
   k. said tank
      (i) mounted on wheels with
      (ii) a trailer hitch,
   m. so that the tank forms a part of a trailer adapted to be towed on highways,
   n. said shell being cylindrical and
   o. said baffle being a segment of a cylinder with the axis of the shell and baffle parallel.

2. In a tank for transporting a compressed liquid gas product,
   a. said tank having an arcuate shell,
   b. a manhole entering into the bottom half of said tank through said shell,
   c. a compressed liquified gas product in said shell with
      (i) the liquid phase of the product filling a majority of the tank,
      (ii) the gas phase thereof filling the remainder of the tank, and
      (iii) the two phases in fluid communication with each other and having an interface therebetween; the improved baffle structure to prevent surging of the liquid comprising:
   d. a rigid baffle in the form of a horizontal plate rigidly fixed to the shell with at least 10% of the total volume of the tank above the baffle,
   e. small vapor vents in said baffle, and
   f. an open passageway to the manhole below the baffle,
   g. said tank
      (i) mounted on wheels with
      (ii) a trailer hitch,
   h. so that the tank forms a part of a trailer adapted to be towed on highways,
   j. said shell being cylindrical, and
   k. said baffle being a segment of a cylinder with the axis of the shell and baffle parallel.

* * * * *